(12) United States Patent
Gladkov et al.

(10) Patent No.: US 7,198,805 B2
(45) Date of Patent: Apr. 3, 2007

(54) METHOD FOR PRODUCING HUMIC ACID SALTS

(76) Inventors: Oleg Andreevich Gladkov, UL.Krzhizhanovskogo, D.7 KV.293, Sankt-Peterburg (RU) 193231; Rodion Borisovich Poloskin, UL.Sovetskaya, D. 35 KV. 26, Sankt-Peterburg (RU) 193144; Yuri Jurievich Polyakov, UL.Nikitinskaya, D. 18 KV. 29, Moskva (RU) 105483; Irina Vasilievna Sokolova, NAB. Krukova Kanala, D.11 KV.39, Sankt-Peterburg (RU) 190088; Nicolay Ivanovich Sorokin, UL.Ziny Portnjvoy, D. 27 KV.69, Sankt-Peterburg (RU) 198207; Aleksey Valerievich Glebov, PR. Veteranov, D. 88 KV.156, Sankt-Peterburg (RU) 198260

( * ) Notice: Subject to any disclaimer, the term of this patent is extended or adjusted under 35 U.S.C. 154(b) by 192 days.

(21) Appl. No.: 10/498,776

(22) PCT Filed: Dec. 16, 2002

(86) PCT No.: PCT/RU02/00533

§ 371 (c)(1),
(2), (4) Date: Jun. 15, 2004

(87) PCT Pub. No.: WO03/051962

PCT Pub. Date: Jun. 26, 2003

(65) Prior Publication Data

US 2005/0069974 A1    Mar. 31, 2005

(30) Foreign Application Priority Data

Dec. 19, 2001   (RU) .............................. 2001134139

(51) Int. Cl.
*A01N 65/00* (2006.01)
(52) U.S. Cl. .................... 424/725; 507/108; 507/107; 507/106

(58) Field of Classification Search .................... None
See application file for complete search history.

(56) References Cited

U.S. PATENT DOCUMENTS

| 4,459,149 | A | * | 7/1984 | Moran et al. ................... 71/24 |
| 5,026,416 | A | * | 6/1991 | Alexander ...................... 71/24 |
| 5,302,180 | A |   | 4/1994 | Hjersted |
| 5,688,999 | A | * | 11/1997 | Lebo, Jr. et al. ............ 562/475 |

FOREIGN PATENT DOCUMENTS

| EP | 0 101 784 A1 | 3/1984 |
| RU | 2108811 | 4/1998 |
| RU | 2125039 C1 | 1/1999 |

OTHER PUBLICATIONS

English translation of RU 2 108 811.*

* cited by examiner

*Primary Examiner*—Susan Coe Hoffman
(74) *Attorney, Agent, or Firm*—Henry M. Feiereisen; Ursula B. Day

(57) ABSTRACT

Humic acid salts are produced, with a high output of useful products, by a liquid-phase oxidation of the mixture of an alkaline agent with a lignin-containing plant raw material having the total content of dry substances of 12–20 %, said oxidation being carried out in two stages. In a first stage, pre-oxidation is carried out at a temperature of 50–190 DEG C. and a pressure of 0.5–3 MPa associated with simultaneous treatment with an oxygen-containing gas until a pH of 10.5–12 is reached. The second stage, i.e. oxidation is carried out in the similar conditions at a temperature of 170–200 DEG C. until a pH of 8.5–10 is reached. The by-product of cellulose production by a sulphite process, i.e. concentrated solutions of lignosulphonate or lignin is used as a lignin-containing plant raw material, said lignin being a by-product of hydrolysis production being continuously oxidised by air oxygen in two stages. In order to additionally activate the mixture of the raw material with alkali, operating in cavitation mode, a circulation pump provided with an ejector for stream ejection of air is used. In order to reduce the pre-oxidation time, the first stage can be carried out using peroxide, or by supplying the raw material and alkali directly to a pipeline prior to an ejector and the mixture thereof with an oxidising agent.

6 Claims, No Drawings

METHOD FOR PRODUCING HUMIC ACID SALTS

FIELD OF THE INVENTION

The invention is related to production of humic acids that can be used in production of fertilizers and in industry as a component of drilling solutions, as wood dye, corrosion and scale inhibitor, etc.

Humic substances are extremely abundant in nature and constitute the main and sometimes predominant part of caustobioliths of carbon series (combustible shales, fossil coals, peat) and natural humites (soils, peat, brown coal and oxidized bituminous coal as well as river, lake and sea bottom sediments). The most important components of humic substances are humic acids.

Product of processing are substances that belong, in terms of their elementary composition and physico-chemical properties, to humic acid salts. Such products can be used in agriculture as a stimulating fertilizer, as a component of organomineral fertilizer, as an activator of microbiological soil decomposition.

BACKGROUND OF THE INVENTION

A prior art method (Rits V. A., Shchupliak A. A., Gladkov O. A., Sokolova I. V., Pelevin L. A. "Method for wastewater neutralization", Patent RU No. 2108811, published on 20 Apr., 1998) for wastewater neutralization provides production of humates by mixing wastewater with an alkaline agent, activation of reaction mixture by hydrodynamic cavitation effect at a temperature of 50–170° C. with simultaneous feed of compressed air under a pressure of 0.2–1.6 MPa. The activated mixture is further heated to an operating temperature of 140–190° C., charged into a reactor, with concurrent supply of compressed air kept at the temperature, settled, and the sediment is separated.

A method for production of humic concentrate from natural humites and caustobioliths of carbon series according to the invention comprises high-temperature treatment of source raw material, mixing with an alkaline agent, oxidation and cooling. Humic concentrate contains hydrated humic acids, humic acid salts and mineral components of source humites and caustobioliths bonded chemically with contained humic acids. (Patent RU 2125039, Shulgin A. I. et al., published 20 Jan. 1999).

The method for producing humic concentrate is realized by electrolysis of water solutions of humic acid salts previously extracted by an alkaline reagent from natural raw material; during electrolysis, the potential set at the anode is sufficient for discharge of humic acid anions but lower than the potential of discharge of hydroxyl ions, which provides production, on the anode surface, of the target humic concentrate continuously withdrawn from the zone of electrolysis.

DISCLOSURE OF THE INVENTION

The objective of the invention is producing humic acid salts in a continuous process with a high yield of useful products.

The objective is attained by providing a continuous process of liquid-phase oxidation of mixture of an alkaline agent with a lignin-containing plant raw material having a total content of dry substances of 12–20%, the process being carried out in two stages. The first stage of pre-oxidation proceeds at a temperature of 50–190° C. and a pressure of 0.5–3 MPa with simultaneous treatment with an oxygen-containing gas until a pH of 10.5–12 is reached, and at the second stage oxidation is carried out in the same conditions at a temperature of 170–210° C. and a pressure of 0.5–3 MPa until a pH of 8.5–10 is reached.

As the lignin-containing plant raw material, a by-product of cellulose production by the sulphite method is used, namely, concentrated solutions of lignosulphonate or lignin, a by-product of hydrolysis production, which are continuously oxidized by air oxygen in two stages.

At both stages, oxidation can be performed by air-containing gas—air at a specific flow rate of 20–65 $nm^3/m^3h$.

It is proposed to carry out the pre-oxidation stage by way of oxidation of lignin-containing raw material at a temperature of 50–190° C. by 12% water solution of hydrogen peroxide during 0.5–3 hours until a pH of 10.5–12 is reached. The quantity of added hydrogen peroxide is 6–8% of the mass of dry substance.

For additional activation of mixture of lignin-containing plant raw material with alkali in cavitation conditions, a circulation pump is used having an ejector for stream ejection of air, which reduces the pre-oxidation time. The first stage can be carried out using oxidation by hydrogen peroxide, and directly in the circulation circuit by feeding the reaction mixture into the pipeline upstream of the ejector.

Addition of hydrogen peroxide solution to the mixture of lignin-containing plant raw material with alkali at a temperature lower than 50° C. is impracticable since in this case the time of hydrogen peroxide decomposition is extended by several hours. Thus, for example, at a temperature of 20° C., the time of hydrogen peroxide decomposition is 5–6 hours. Addition of hydrogen peroxide solution at a temperature higher than 80° C. to the alkaline medium drastically accelerates its decomposition by reactions of ionic nature; in this process, due to interaction with the plant raw material, hydroperoxides are produced which are hydrolyzed in the alkali medium with regeneration of hydrogen peroxide.

For the selected direction of reaction, pH of the initial solution must be at least 12 since the contribution of the ionic reaction to the process of hydrogen peroxide transformation at pH=10 is only 17.6%, and at pH=12 it is already 53.6%. In addition, production of quinones which are a bridge for further condensation of high-molecular humic substances is noticed only at pH exceeding 12.

Oxidation of lignin-containing raw material released during hydrogen peroxide decomposition by oxygen proceeds according to the radical-chain mechanism and results in a partial destruction of the product, which is confirmed by an almost two-fold increase in the content of strong-acid groups in terms of carboxyl groups and formation of up to 3% of quinone groups.

An increase in the hydrogen peroxide treatment time to more than 60 minutes does not result in an increase of quinone and acid groups content.

Agitation of the mass by circulation pumps provides repeated activation under cavitation conditions by stream ejection of air, which creates optimum mass-exchange conditions, increases the air utilization coefficient and reduces the time of the mass staying in the apparatus.

In order to increase the functional usefulness of humic salts produced by the proposed method as fertilizers, a calculated quantity of microelements in the form of appropriate compounds is added to the final product while being stirred, either at the second oxidation stage, or after cooling the final product to 70–100° C.

Humic substances are good complexing agents, therefore, the majority of macro- and microelements in a soluble state are included in the products in a chelate form which is most accessible for plant.

EXAMPLE 1

Concentrated Lignosulphonates are Treated.

| Characteristics of the initial lignosulphonates: | |
|---|---|
| mass share of dry substances, % | 49.0 |
| mass share of ashes, % | 18.6 |
| mass share of organic substances, % | 81.4 |
| pH of water solution | 5.6 |

Initial lignosulphates in an amount of 100 kg are diluted in 250 l of water and mixed with 12 kg (30% of mass of organic substances) of sodium hydroxide diluted in 50 l of water. The mixture is heated in a heat exchanger to a temperature of 180° C. and charged by a dosing pump, through the heat exchanger, to a pre-oxidation reactor through which air is bubbled under a pressure of 2.0 MPa, at a specific flow rate of up to 20–30 $nm^3/m^3$.

On reaching a pH of 11, the mass is fed to an oxidation reactor where a temperature of 180° C. is maintained, through which air bubbling is provided at a specific flow rate of 40–50 $nm^3/m^3$ and a pressure of 2.5 MPa is maintained. After a pH of 9.6 is reached, the mass is supplied to a heat exchanger where it is cooled down to 70° C. and then discharged to the final product tank.

| Characteristics of the final product: | |
|---|---|
| mass share of dry substances, % | 19.3 |
| mass share of ashes, % | 38.2 |
| mass share of humic acids recalculated on the basis of organics content, % | 74.1 |
| mass share of fulvic acids recalculated on the basis of organics content, % | 12.1 |
| pH of the medium | 9.6 |

EXAMPLE 2

The same lignosulphonates at the same dilution rate as in example 1 were used. Mixture of lignosulphonates with alkali is heated in a heat exchanger to 70° C. and fed to a separate reactor. 28.7 l (6% of organic substances content) of previously prepared 12% solution of hydrogen peroxide is added to the same reactor by portions, during 0.5 hours. The solution is self-heated to 85° C., the mass is allowed to cool for 45 minutes, during which the temperature decreases to 70° C.

The characteristics of the lignosulphonate solutions after oxidation by hydrogen peroxide are presented in Table 3.

After oxidation by hydrogen peroxide, the mass is heated in a heat exchanger to a temperature of 200° C. and fed by a dosing pump, through the heat exchanger, to an oxidation reactor where air bubbling is provided at a specific flow rate of 50 $nm^3/m^3$ and a pressure of 2.5 MPa is maintained. After a pH of 10 is reached, the mass is cooled in a heat exchanger down to 100° C. and then discharged to the final product tank.

| Characteristics of the final product: | |
|---|---|
| mass share of dry substances, % | 20.2 |
| mass share of ashes, % | 40.2 |
| mass share of humic acids recalculated on the basis of organics content, % | 77.2 |
| mass share of fulvic acids recalculated on the basis of organics content, % | 18.4 |
| pH of the medium | 10 |

EXAMPLE 3

Lignosulphonates are treated in the same way as in example 2.

On reaching a pH of 10, the mass is passed through a heat exchanger where it is cooled to 100° C., and then it is pumped to a separate tank having a stirrer. Dry salts containing microelements and boric acid are added sequentially to the tank in the following quantities:

| | | |
|---|---|---|
| $MnSO_4.5H_2O$ | 351.0 g | containing 80 g of Mn |
| $CuSO_4.5H_2O$ | 314.0 g | containing 80 g of Cu |
| $ZnSO_4.7H_2O$ | 420.0 g | containing 96 g of Zn |
| $Co(NO_3)_3.6H_2O$ | 474.1 g | containing 120 g of Co |
| $(NH_4)_6Mo_7O_{24}$ | 154.5 g | containing 12 g of Mo |
| $H_3BO_4$ | 687 g | containing 120 g of B |

Stirring is continued until all salts are completely dissolved.

| Characteristics of the final product: | |
|---|---|
| mass share of dry substances, % | 19.2 |
| mass share of ashes, % | 39.4 |
| mass share of humic acids recalculated on the basis of organics content, % | 72.6 |
| mass share of fulvic acids recalculated on the basis of organics content, % | 14.4 |
| mass share of microelements, %: | Mn - 0.050; Cu - 0.067; Zn - 0.080; Co - 0.078; Mo - 0.01; B - 0.060. |

EXAMPLE 4

The same lignosulphonates at the same dilution rate as in example 1 were used.

Mixture of lignosulphonates with alkali is heated in a heat exchanger to 50° C. and fed to a separate reactor. 28.7 l (6% of organic substances content) of previously prepared 12% solution of hydrogen peroxide is added to the same reactor by portions, during 0.5 hours. The solution is self-heated to 85° C., the mass is allowed to cool for 45 minutes, during which the temperature decreases to 70° C.

After oxidation by hydrogen peroxide, the mass is heated in a heat exchanger to a temperature of 210° C. and fed by a dosing pump, through the heat exchanger, to an oxidation reactor where air bubbling is provided at a specific flow rate of 65 $nm^3/m^3$ and a pressure of 3.0 MPa is maintained. After a pH of 9.6 is reached, the mass is cooled in a heat exchanger down to 100° C. and then discharged to the final product tank.

| Characteristics of the final product: | |
|---|---|
| mass share of dry substances, % | 20.0 |
| mass share of ashes, % | 39.8 |
| mass share of humic acids recalculated on the basis of organics content, % | 67.0 |
| mass share of fulvic acids recalculated on the basis of organics content, % | 11.3 |
| pH of the medium | 9.6 |

EXAMPLE 5

Initial lignosulphonates as described in example 1, in an amount of 100 kg, are diluted in 250 l of water and mixed with 12 kg (30% of mass of organic substances) of sodium hydroxide diluted in 50 l of water. The mixture is heated in a heat exchanger to a temperature of 190° C. and charged by a dosing pump, through the heat exchanger, to a pre-oxidation reactor through which air is bubbled under a pressure of 2.0 MPa, at a specific flow rate of up to 20 $nm^3/m^3$.

On reaching a pH of 11, the mass is fed to an oxidation reactor where a temperature of 210° C. is maintained, through which air is bubbled at a specific flow rate of 40–50 $nm^3/m^3$ and where a pressure of 2.5 MPa is maintained. After a pH of 8.5 is reached, the mass is supplied to the heat exchanger where it is cooled down to 70° C. and then discharged to the final product tank.

| Characteristics of the final product: | |
|---|---|
| mass share of dry substances, % | 19.3 |
| mass share of ashes, % | 39.1 |
| mass share of humic acids recalculated on the basis of organics content, % | 71.0 |
| mass share of fulvic acids recalculated on the basis of organics content, % | 10.8 |
| pH of the medium | 8.5 |

EXAMPLE 6

The substance used for treatment was lignin, a by-product of hydrolysis production.

250 kg of water is added to 50 kg of lignin, and 20% water suspension produced is mixed with 6 kg of sodium hydroxide diluted in 25 l of water.

The mixture is heated in a heat exchanger to 190° C. and fed by a dosing pump, through the heat exchanger, to a after-oxidation reactor through which air is bubbled under a pressure of 3 MPa, at a specific flow rate of 40 $nm^3/m^3$.

On reaching a pH of 10.5, the mass is fed to an oxidation reactor where a temperature of 210° C. is maintained, through which air is bubbled at a specific flow rate of 65 $nm^3/m^3$ h and where a pressure of 3 MPa is maintained. The reaction proceeds until a pH of 10 is reached.

| Characteristics of the final product: | |
|---|---|
| mass share of dry substances, % | 17.3 |
| mass share of ashes, % | 33.8 |
| mass share of humic acids recalculated on the basis of organics content, % | 64.3 |
| mass share of fulvic acids recalculated on the basis of organics content, % | 15.3 |
| pH of the medium | 10 |

Table 1 presents characteristics of the final product depending on the conditions of oxidation; the data demonstrate attainment of the technical result.

TABLE 1

Composition and properties of humic substances produced from diffrent types of raw materials. Characteristics of products of lignin-containing materials oxidation depending on the oxidation method

| | | | Share of organic mass, % | | Carboxyl groups content, % | |
|---|---|---|---|---|---|---|
| No. | Boiling conditions | Mass share of ashes, % | H-humate | H-fulvate | H-humates | H-fulvates |
| 1. | Example 1 | 38.2 | 74.1 | 12.1 | 3.4 | 6.8 |
| 2. | Example 2 | 40.2 | 77.2 | 18.4 | 3.3 | 6.6 |
| 3. | Example 3 | 38.2 | 74.1 | 12.1 | 3.4 | 6.8 |
| 4. | Example 4 | 39.8 | 67.0 | 11.3 | 3.1 | 6.5 |
| 5. | Example 5 | 39.1 | 71.0 | 10.8 | 2.8 | 5.7 |
| 6. | Example 6 | 33.8 | 64.3 | 15.3 | 2.3 | 5.0 |

INDUSTRIAL APPLICABILITY

The process of oxidative-hydrolytic destruction of lignin-containing raw materials in an alkaline medium at a high temperature is similar to the natural humification process in the following features:
- a part of organic substances is oxidized to carbon dioxide, water and low-molecular organic acids;
- another part of organic substances is transformed into dark-coloured high-molecular substances which can be released from the solution by acidification with a mineral acid;
- elementary composition, IR spectra and other physico-chemical and biological properties of products released by acidification and humic acids of other origin are identical.

In the process of pre-oxidation by air oxygen or by hydrogen peroxide under effect of a temperature of 50–190° C., sulpho-groups are hydrolyzed, and phenols produced in this process have a high reactivity for regrouping reactions with detachment of lateral chains and polycondensation. Polyester bonds and methylol groups are also hydrolyzed with formation of phenols which, under action of alkali, produce quinones. On the other hand, during degradation of the lignosulphone complex, carbonions are produced which interact with quinones with formation of condensed structures. At a temperature of 170–210° C., reactions of three-dimension condensation and deep degradation of desulphurized lignosulphonates take place. The high-molecular compounds produced have carboxyl groups at their periphery, which promotes dissolution of oxidation products in alkali and causes similarity of the products obtained to humic acids, both natural and produced from other types of raw materials (peat, coal) (Table 2, Table 3).

Another confirmation of the humic nature of the products is their dark colour, which is due to the system of conjugation of double bonds of polycondensed structures and oxygen, including the presence of quinones.

TABLE 2

Elementary composition of humic acids produced from different types of raw materials by the oxidative destruction method

| Specimen | Raw material for humate | Atomic ratios, % | | | | | C:H | Degree of oxidation |
|---|---|---|---|---|---|---|---|---|
| | | C | H | N | S | O | | |
| Oxidate Prior art method | Activated sludge | 35.75 | 50.58 | 2.90 | — | 10.71 | 0.707 | −0.213 |
| Oxihumate Prior art method | Peat | 29.50 | 38.86 | 1.08 | — | 30.53 | 0.706 | −0.163 |
| Lignohumate (method according to the invention) | Ligno-sulphonate | 36.90 | 45.72 | 0.32 | 1.18 | 15.86 | 0.857 | −0.385 |

TABLE 3

Composition and properties of humic substances produced from different types of raw materials by the oxidative destruction method

| Specimen | Raw material for humate | PH of water extract | Mass share of ashes, % | Mass share of H-humate, % of organics | Mass share of H-fulvate, % of organics | Optical density, $D_{400}/D_{440}$ |
|---|---|---|---|---|---|---|
| Oxidate (prior art method) | Activated sludge | 10.35 | 38.7 | 35.9 | 5.4 | 1.204 |
| Oxihumate (prior art method) | Peat | 10.81 | 21.72 | 28.0 | 7.2 | 1.204 |
| Lignohumate (method according to the invention) | Ligno-sulphonate | 9.84 | 34.0 | 64.4 | 12.7 | 1.206 |

The invention claimed is:

1. A method for producing humic acid salts by treatment of a water suspension of a plant raw material comprising the steps of:
   pre-mixing a 12–20% water suspension of plant raw material of lignin or lignosulphonate, a by-product of sulphite cellulose production, with an alkaline agent, which is sodium hydroxide;
   thereafter treating the suspension in a two stage high temperature treatment; wherein in a first stage of the two stage high temperature treatment the suspension is continuously heated with an oxidizing agent to a pre-oxidation temperature of 50–190° C. and a pressure of 0.5–3 MPa until a pH value of 10.5–12 is reached, and thereafter subjecting the mixture to a second of the two stage heat treatment at a temperature of 170–210° C. and a pressure of 0.5–3 MPa until a pH value of 8.5–10 is reached whereby a main oxidation takes place, thereafter cooling the mixture.

2. The method in accordance with claim 1, wherein oxidation at both stages is carried out using an oxygen-containing gas at a specific flow rate of 20–65 nm$^3$/m$^3$h.

3. The method in accordance with claim 1, wherein main oxidation is carried out while the mixture of the raw material and the alkaline agent is agitated by a circulation pump with simultaneous activation of the mixture by means of a hydrodynamic cavitation effect during stream ejection of air.

4. The method in accordance with claim 1, wherein pre-oxidation is carried out in a circulation circuit by feeding the mixture of the raw material and the alkaline agent directly to a pipeline upstream of an ejector prior to mixing with an oxidant.

5. The method in accordance with claim 1, wherein pre-oxidation is carried out using 12% solution of hydrogen peroxide in an amount of 6–8% of the mass of organic substances in lignin-containing plant raw material at a temperature of 50–80° C.

6. The method in accordance with claim 1, wherein in order to prepare humic acid salts with microelements, suitable compounds are added in the course of the second stage of oxidation or after cooling the mixture to 70–100° C.

* * * * *